United States Patent
Jinks

[11] Patent Number: 5,863,058
[45] Date of Patent: Jan. 26, 1999

[54] ADULT TRICYLCE FOR CARRYING PASSENGERS

[76] Inventor: Charles A. Jinks, 12127 Dalhart Dr., Fenton, Mich. 48430

[21] Appl. No.: 573,264

[22] Filed: Dec. 15, 1995

[51] Int. Cl.$^6$ .................................................. B62K 5/04
[52] U.S. Cl. ........................................ 280/202; 280/282
[58] Field of Search .................................. 280/202, 203, 280/204, 282, 801.1; D12/112, 113

[56] References Cited

U.S. PATENT DOCUMENTS

| | | | |
|---|---|---|---|
| D. 60,223 | 1/1922 | Duguid | D12/113 |
| D. 254,968 | 5/1980 | Moore et al. | D12/112 |
| D. 280,890 | 10/1985 | Trudo et al. | D12/112 |
| D. 289,271 | 4/1987 | Hendrickson et al. | D12/112 |
| D. 289,273 | 4/1987 | Berger | D12/112 |
| D. 338,433 | 8/1993 | Crooks, Sr. | D12/112 |
| D. 368,680 | 4/1996 | Freeman | D12/113 |
| 3,415,539 | 12/1968 | Stevens | 280/203 |
| 3,866,945 | 2/1975 | Bingham | 280/202 |
| 3,878,810 | 4/1975 | Conrad | 116/28 R |
| 3,954,283 | 5/1976 | Boehm et al. | 280/273 |
| 3,975,849 | 8/1976 | Tuleja | 40/125 N |
| 4,176,880 | 12/1979 | Marchello | 297/452 |
| 4,458,908 | 7/1984 | Strong | 280/239 |
| 4,966,381 | 10/1990 | Feikema | 280/261 |
| 5,687,980 | 11/1997 | Eckroth | 280/204 |

FOREIGN PATENT DOCUMENTS

| | | | |
|---|---|---|---|
| 224819 | 3/1943 | Switzerland | 280/204 |

*Primary Examiner*—Brian L. Johnson
*Assistant Examiner*—Avraham H. Lerner
*Attorney, Agent, or Firm*—David L. Volk

[57] ABSTRACT

An adult tricycle is provided comprised of a standard conventional adult tricycle and a double occupancy child seat connected with the operator's portion of the vehicle. In this configuration a child or children would be able to sit in a safe environment behind the operator's seat. The child's seat includes a padded seat with seat belts, and an enclosed front, sides, and back, in order to prevent accidental entanglement between the passengers and any of the moving parts. With the seating area being part of the operator portion of the tricycle, as opposed to a trailer-style, the tricycle achieves much greater stability and security for both operator and passengers.

5 Claims, 3 Drawing Sheets

ADULT TRICYLCE FOR CARRYING PASSENGERS

BACKGROUND OF THE INVENTION

1. Field of the Invention

The present invention relates generally to velocipedes, and, more particularly, to a unique tricycle for the safe transport of young children in a stable, yet comfortable manner.

2. Description of the Related Art

As is well-known in the art, many adult tricycles are known. For example, in U.S. Pat. No. 4,966,381, issued in the name of Feikema, an adult tricycle is disclosed having a single seat for carrying a driver and a frame which provides easy egress.

Also, in U.S. Pat. No. 3,954,383, issued in the name of Boehm et al., a tandem tricycle is disclosed having an elongated frame supporting a pair of seat and handlebar sets arranged in tandem.

And again, in U.S. Pat. No. 4,458,908, issued in the name of Strong, a tandem tricycle is disclosed resembling a pair of bicycles wherein the rear wheel of the frontmost bicycle is shared as the front wheel of the rearmost bicycle.

Finally, an ornamental design for an adult tricycle is disclosed in U.S. Design Pat. No. 338,433, issued in the name of Crooks, Sr., and an ornamental design for a two-seat tricycle is disclosed in U.S. Design Pat. No. 289,271, issued in the name of Hendrickson et al.

Although many designs are known and disclosed in the above references, none provide an adult tricycle having a double occupancy child seat provided behind the operator's seat.

Consequently, a need has been felt for providing an adult tricycle for carrying two passengers designed for both stable operation, even on unlevel terrain, as well as safe transportation for young children.

SUMMARY OF THE INVENTION

It is therefore an object of the present invention to provide an improved adult tricycle having double passenger occupancy.

It is another object of the present invention to provide an improved adult tricycle adaptable to safely transport young children.

It is yet another object of the present invention to provide an improved adult tricycle capable of safe operation and a secure ride even on unlevel terrain.

It is a feature of the present invention to provide an improved adult tricycle having a plurality of passenger seats.

Briefly described according to one embodiment of the present invention, an adult tricycle is provided carrying a double occupancy child's seat connected with the operator's portion of the vehicle. In this configuration a child or children would be able to sit in a safe environment behind the operator's seat. The child's seat includes a padded seat with seat belts, and an enclosed front, sides, and back, in order to prevent accidental entanglement between the passengers and any of the moving parts. With the seating area being part of the operator portion of the tricycle, as opposed to a trailer-style, the tricycle achieves much greater stability and security for both operator and passengers.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
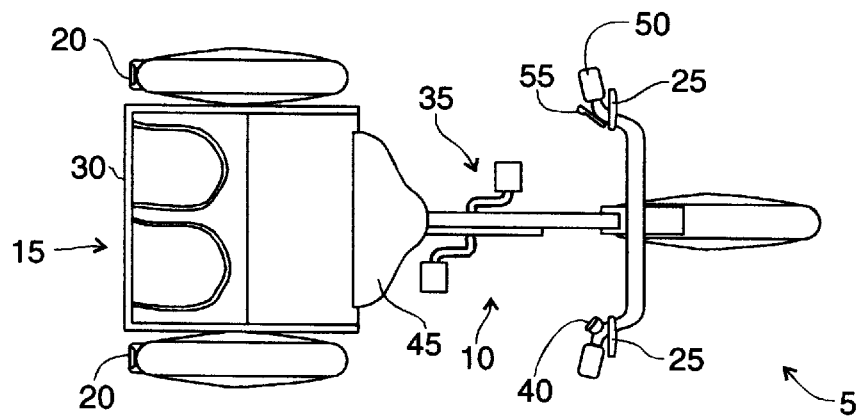
FIG. 1 is a top plan view of an adult tricycle according to the preferred embodiment of the present invention.
Figure 2:
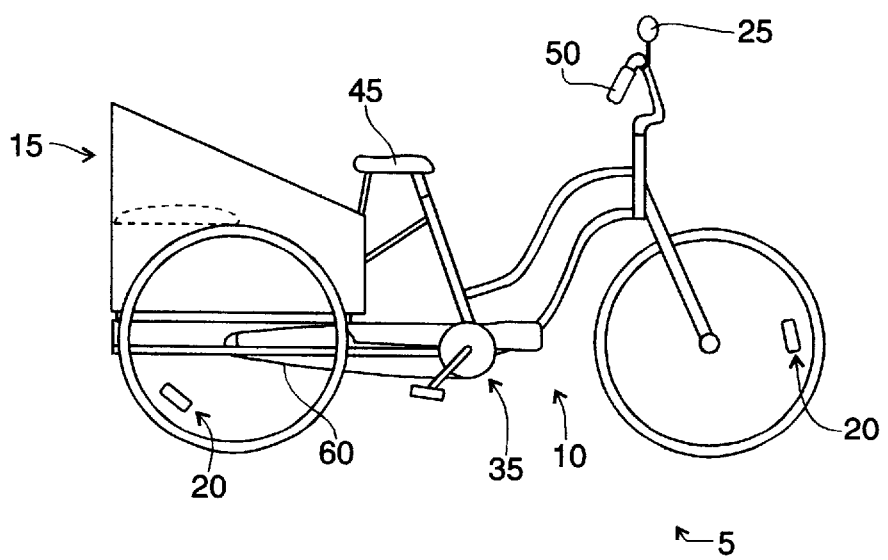
FIG. 2 is a side elevational view thereof.
Figure 3:
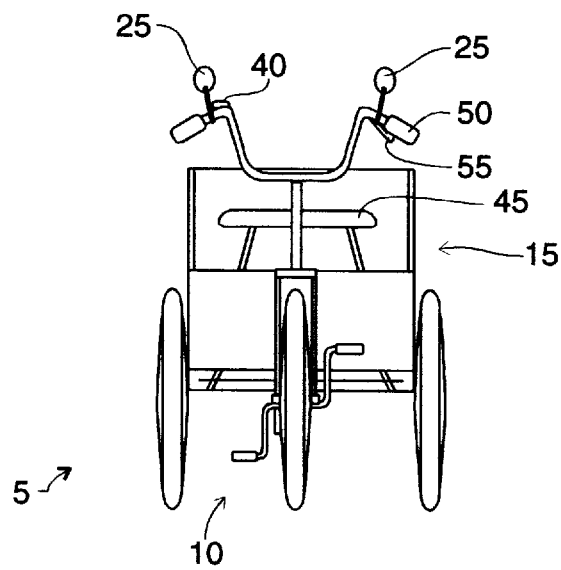
FIG. 3 is front elevational view thereof.

Referring now to FIGS. 1–3, an adult tricycle for carrying passengers 5 is shown, according to the present invention. A standard adult tricycle 10 is provided upon which a child seat platform 15 is mounted in between the rear wheels as shown. The child seat platform 15 will be described in greater detail below. The standard adult tricycle 10 would be equipped with various safety devices including a plurality of reflectors 20, a set of rear view mirrors 25, and a slow moving vehicle sign 30. In addition the standard adult tricycle 10 would possess the normal convenience items including pedal with gear drive 35, a gear ratio changer 40, an operator seat 45, a cushioned handlebar 50, a front brake system 55, and a rear brake system 60.

Figure 4:
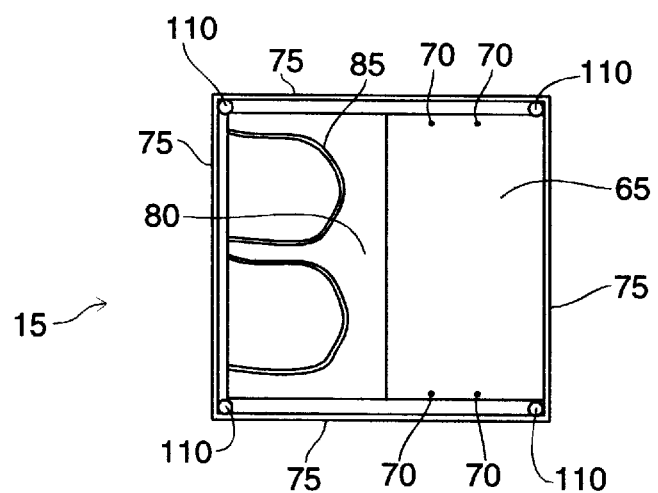
FIG. 4 is a detailed top plan view of the child seating platform.
Figure 5:
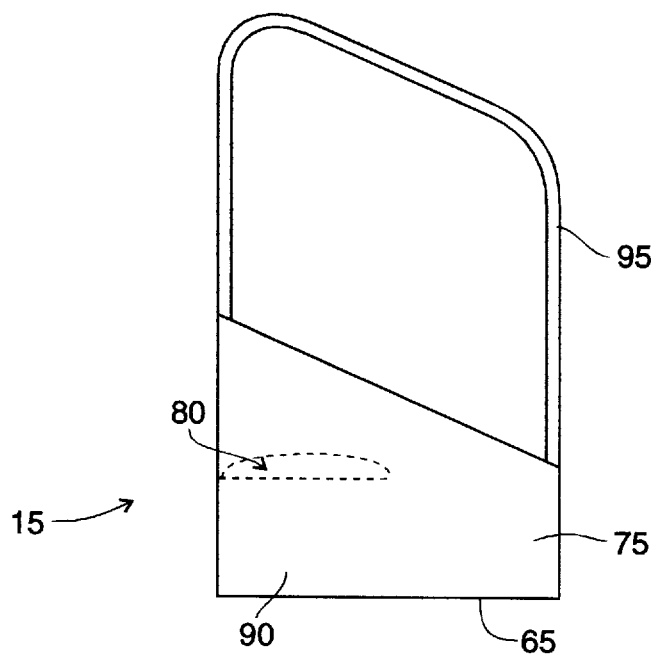
FIG. 5 is a side elevation of the child seating area.
Figure 6:
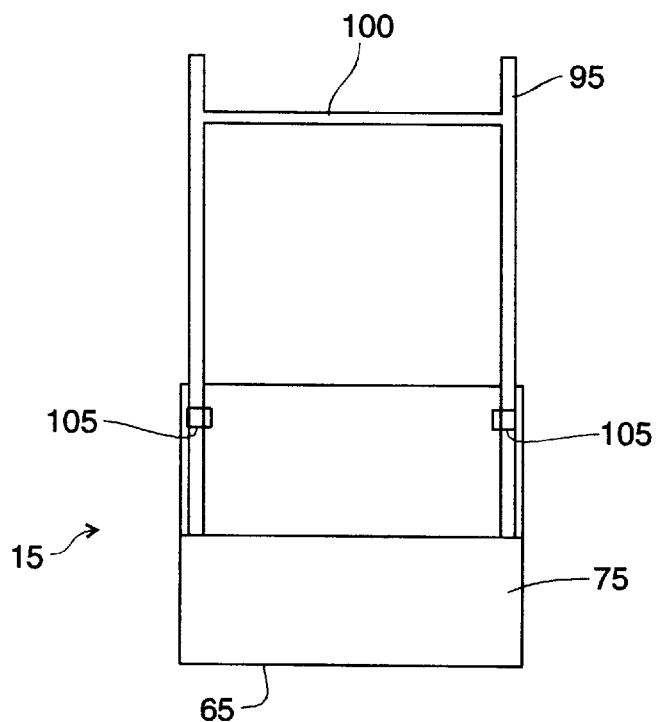
FIG. 6 is a front elevation of the child seating area.

Referring now to FIGS. 4–6, the child seat platform 15 is shown in greater detail. A platform floor 65 is held in firm mechanical contact with the standard adult tricycle 10 (not shown) by a plurality of fastening means 70 such as bolts or screws. The platform floor 65 is flat, horizontally elongated, and solid to prevent objects from falling out or road debris or liquids from coming in. The platform floor 65 supports along its exterior edges in a perpendicular manner a grouping of platform sides 75 also of a flat, horizontally elongated and solid nature for the reasons as listed above. The exterior outward pair of platform sides 75 as well as the rearward facing platform sides 75 provides support for a child seat bench 80. It is intended that the child seat bench 80 be of a padded nature for comfortable seating. The child seat bench 80 also provides for a set of seat belts 85 for the safety of the children passengers. The area directly under the child seat bench 80 provides for a storage area 90 for storage of items such as parcels and the like. For use in inclement weather conditions an enclosure support frame 95 is provided. The enclosure support frame 95 includes a frame cross bracing 100, a set of fastening means 105 as well as a set of guide holes 110 in the platform floor 65. The enclosure support frame 95, constructed of aluminum tubing or other equally strong material, would provide support for a protective covering enclosure (not shown) such as a tarpaulin, plastic sheeting, or laminated wood sheeting. The fastening means 105 would be a nature to allow for ease of removal of the enclosure support frame 95, such as quick release clips, screws, or bolts. It can be seen by those familiar with the art that by extension of the enclosure support frame 95, a protective covering could be afforded to the operator of the adult tricycle for carrying passengers 5.

It is anticipated that the child seat platform 15, including the platform floor 65 and the platform sides 75 will be manufactured of a suitably strong material such as steel, however, other equally strong materials such as aluminum, plastic, a fiberglass resin or laminated wood may be used.

2. Operation of the Preferred Embodiment

In operation, the present invention can be utilized by the common user in a simple and effortless manner. To use the present invention with its preferred embodiment can best be described in conjunction with the top plan views of the adult tricycle for carrying passengers 5 and corresponding elevation views of FIGS. 1–6.

The user first utilizes the adult tricycle for carrying passengers 5 by installing the enclosure support frame 95 and corresponding protective covering enclosure in case of inclement weather. If travel of an open air nature is desired, this step could be omitted. The user would then place the one or two children on the child seat bench 80 in a forward facing manner and secure the child or children via the seat belts 85. The user would then mount the adult tricycle for carrying passengers 5 in the operators position and proceed to initiate travel via the pedal with gear drive 35 and cushioned handlebar 50 as one would be normally accustomed to. The close physical proximity of the child or children to the user affords the user to opportunity to converse with the child or children. Additionally, the three point support nature of the standard adult tricycle 10 provides for increased safety during entry and exit of the adult tricycle for carrying passengers 5 for both the user and the child or children.

The foregoing description is included to illustrate the operation of the preferred embodiment and is not meant to limit the scope of the invention. The scope of the invention is to be limited only by the following claims.

What is claimed is:

1. In an adult tricycle for carrying passengers, said tricycle having one front wheel, two rear wheels, an operator's seat having a rear edge and a front end, a frame, and a multiple occupancy passenger seat having two ends, a back edge and a front edge, the passenger seat positioned directly behind the operator's seat and between the two rear wheels, the improvement comprising the rear edge of the operator's seat being substantially as long as the front edge of the passenger seat, and a wall at each of the ends of the passenger seat, the walls extending from the back edge of the passenger seat, to between the rear edge and the front end of the operator's seat.

2. The adult tricycle of claim 1, wherein the passenger seat is padded and includes a plurality of seat belts for retaining occupants on the passenger seat.

3. The adult tricycle of claim 1, further comprising:

a plurality of reflectors;

a set of rear view mirrors;

a slow moving vehicle sign;

a pedal with gear drive;

a gear ratio changer;

a cushioned handlebar;

a front brake system; and a rear brake system.

4. The adult tricycle of claim 1, further comprising a storage area for storage of items directly under the passenger seat.

5. The adult tricycle of claim 1, further comprising:

a pedal with gear drive;

a gear ratio changer;

a cushioned handlebar;

a front brake system; and a rear brake system.

\* \* \* \* \*